Jan. 10, 1961    P. LACHAIZE    2,967,469
PHOTOGRAPHIC CAMERA
Filed Oct. 8, 1957    3 Sheets-Sheet 1

Jan. 10, 1961 P. LACHAIZE 2,967,469
PHOTOGRAPHIC CAMERA
Filed Oct. 8, 1957 3 Sheets-Sheet 2

United States Patent Office 2,967,469
Patented Jan. 10, 1961

2,967,469
PHOTOGRAPHIC CAMERA

Paul Lachaize, Tassin la Demi-Lune (Rhone), France, assignor to Mecimap, Villeurbanne, France, a company of France Filed Oct. 8, 1957, Ser. No. 688,898

Claims priority, application France Oct. 12, 1956

5 Claims. (Cl. 95—11)

When it is desired to take photographs under insufficient illuminating conditions, it is of conventional practice to associate with the camera a flash-light producing a flash at the moment of the release of the camera shutter.

The conventional arrangement includes chiefly a loading voltaic cell of generally 22.5 volts, a condenser, a resistance adapted to uniformize the output of the cell through the condenser, a bulb containing a filament of a magnesium alloy and a reflector. These parts which are contained inside and on the camera case form a comparatively bulky system provided with means which secure it to the camera and also with a jack adapted to engage a socket provided therefor on the camera.

Independently of the trouble arising through its bulk, chiefly when it is not being used, such a flash-light system requires an intricate assembly and furthermore the amateur operator is constrained to make tedious calculations so as to adjust the diaphragm of the camera as a function of the distance separating the camera from the subject or scene to be photographed or of the general luminosity in front of the objective.

My invention removes these drawbacks and covers a camera incorporating the flash-light arrangement without any substantial increase in the bulk of the camera, said flash-light being adapted for use when desired without any calculation being required for the focusing of the camera under flash-light conditions.

To this end, said camera is provided on its front surface with a disc eccentrically mounted with reference to the objective and operatively connected with the diaphragm, said disc carrying a scale of film sensitivities while there are arranged concentrically with said disc various indications distributed on a plurality of sectors and corresponding on each sector to a predetermined luminosity and to a well-defined range of view-taking for a predetermined flash-light bulb. Thus, the adjustment consists in making the said disc turn so as to bring the scale corresponding to the sensitivity of the film carried inside the camera into registry with the indication corresponding to the actual luminosity at the moment of the view-taking in the case of daylight photographing or to the range of view-taking under flash-light conditions.

In order that the operator need not remember the actual sensitivity of the film contained in his camera, there is provided, according to a preferred embodiment of the latter, in coaxial relationship with the diaphragm-adjusting disc a ring or annulus the angular position of which is adjustable and which carries a pointer which is brought once and for all into registry with the scale sub-division corresponding to the sensitivity of the film, said annulus serving before each exposure as a control member for the above-mentioned disc as provided by bringing said pointer into registry with the desired indication carried by one of the outer sectors.

Although this camera may be designed so as to operate for a single view-taking speed, it is however of advantage to design it in a manner such that it is possible to use two speeds, to wit, for instance, a so-called normal speed of 1/50 of a second and a so-called sporting speed of 1/200 of a second.

To this end, the indications of daylight luminosities and of flash-light ranges are carried by an arcuate member or plate coaxial with the disc and annulus mentioned hereinabove, said member being secured to the spindle carrying the disc through light elastically operating means while it is also positioned on the camera case through the agency of a more powerful elastic connection so that it may occupy on said case two different positions depending on the desired speed of operation.

The rotation of the disc provides no modification in the positioning of said arcuate member and leads only to a change of diaphragm opening while the positive shifting of said arcuate member produces simultaneously a shifting of said disc and a change of the diaphragm opening.

A further important feature of my improved camera consists in that it is designed in a manner such that it houses the flash-light system without any substantial increase in the bulk of the camera.

To this end, the take up spool is constituted by an outer cylinder adapted to rotate freely round a cylindrical cage which is rigid with the case of the camera and opens into one of the outer surfaces of said case, said cage housing the support for the flash-light bulb and its reflector; said support is adapted to selectively recede completely inside its cage or occupy a position such that the bulb and the reflector are located outside said cage, while the cell, condenser, current uniformizing resistance and the like parts are positioned inside the case of the camera preferably to one side of the feed spool.

The cage which serves for housing the support of the bulb and of the reflector is obviously provided with contact pieces arranged in a manner such that the flash-light bulb is energizable only when said support has been shifted into its outer position to allow flash-light operation.

My improved camera includes of course the different parts which are conventional in all cameras, such as the objective, the shutter, the camera obscura, the view meter and the like.

However, it is provided by reason of the structure of its take up spool with a special drive for the film, which forms a further important feature of my invention.

The take up spool is as a matter of fact advantageously constituted by a cylinder and two lateral flanges which further the winding of the film while a terminal surface includes in its central section a projection passing through the case of the camera and carrying on the outside of the latter a spool driving member for the winding of the film.

According to a preferred embodiment, said spool driving member forms a knob with radial projections, each provided with an opening which is engaged elastically after a fraction of a revolution of the knob by a stud carried by a blade spring secured to the case so that after each rotation by this fraction of a revolution of said knob, there is obtained a locking corresponding to the desired progression of the film by one picture area. Each further progression of the film requires a manual operation on the spring blade with a view to providing its release and then an actuation of the control knob. Lastly, by reason of the well known properties of the magnesium and the like flash-light bulbs preferably provided on the camera, it is however necessary for the exposures to be made only for the slowest speed available when the flash-light is being used.

To this end, there is pivotally secured to the cylindrical cage rigid with the case and containing the flash-light bulb and its support, a two-arm lever of which one arm is housed inside the cage, while the other arm extends between said case and the cage. The arcuate member or plate carrying the indications of luminosities and ranges is provided with a projection which, in the case where this arcuate member occupies a position corresponding to the slow exposure speed, is not in contact with the second lever arm just referred to. Thus, said lever may rock freely when the bulb support is drawn out of the camera and comes into contact with the first arm of the said lever whereas if the arcaute member occupies a position corresponding to high speed, the projection controlled by said member is in contacting relationship with the second arm of said lever and, thus, the raising of the bulb support produces through said lever a receding movement of said projection so that the arcuate member is now set in its position corresponding to the slower speed of exposure which leads consequently to a modification in the diaphragm opening.

I have illustrated by way of example and by no means in a limiting sense a preferred embodiment of my invention in accompanying drawings, wherein.

Figure 5:
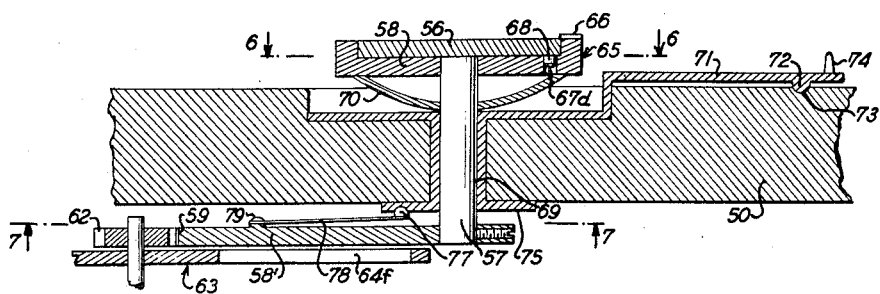
Fig. 5 is on a larger scale a partial longitudinal sectional view of said means.
Figure 6:
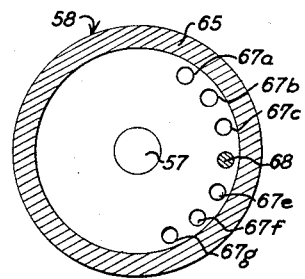
Figure 7:
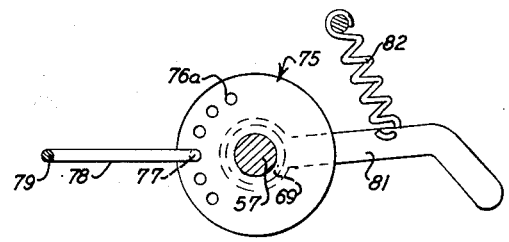

Figs. 6 and 7 are detail sectional views through lines 6—6 and 7—7 of Fig. 5.

Figure 9:
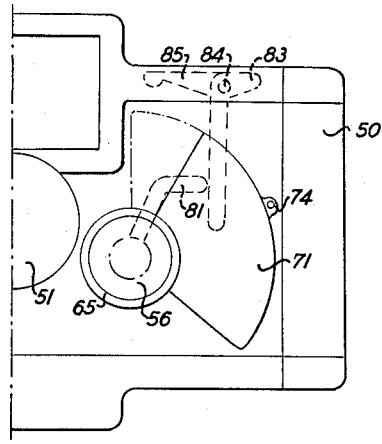
Figure 8:
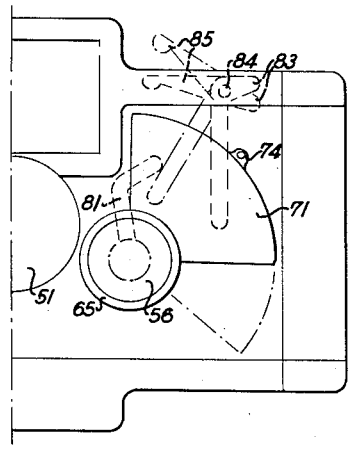

Figs. 8 and 9 are partial detail elevational front views showing the arrangement which serves for preventing flash-light operation at a speed of 1/200.

Figure 10:
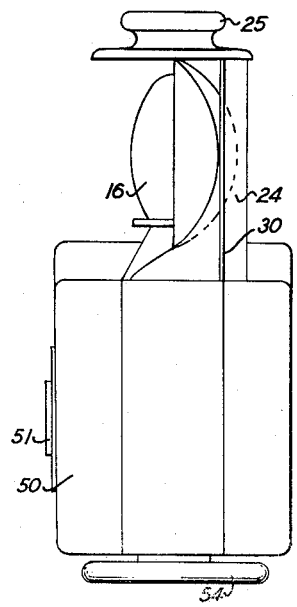

Fig. 10 is a side elevational view of the camera arranged for flash-light operation.

Figure 11:
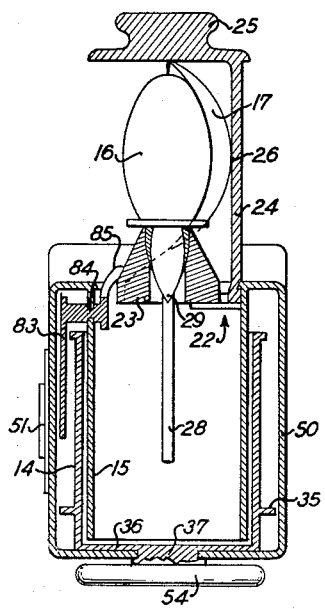

Fig. 11 is a vertical cross-section view of the camera with said camera being assumed to be in the position illustrated in Fig. 10.

In the drawings, 50 designates the case of the camera, having an objective system 51, a finder 52, a stud 53 controlling the release of the shutter, a knob 54 controlling the progression of the film and a knob 55 controlling the return movement of the film when it is desired to rewind it on the feed spool or inside the loading magazine.

Figure 4:
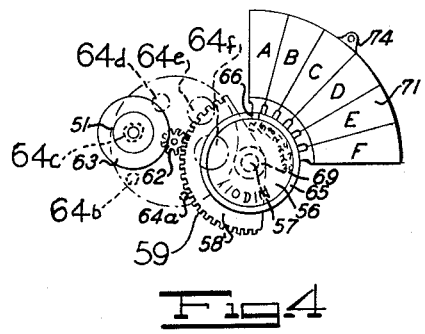
Fig. 4 is a diagrammatic plan view of the diaphragm controlling means.

The front surface of the case 50 carries a disc 56 arranged eccentrically with reference to the objective system 51 and which is keyed to a spindle 57, as shown in Fig. 4, said disc 56 carries a scale arranged along an arcuate line, which scale indicates different film sensitivities and its subdivisions correspond to successive modifications by 1/10 D.I.N.

Inside the case 50 a sector-shaped member 58' is keyed to the said spindle 57; said member 58' is provided with an arcuate series of teeth 59 engaging a pinion 62 keyed to the same spindle as a diaphragm disc 63 acting as a diaphragm; said diaphragm disc is provided to this end with six openings 64a, 64b, 64c, 64d, 64e and 64f (opening 64c not being shown) of different diameters which are distributed along a line concentric with the pinion 62 and disc 63.

Coaxially with the scale-carrying disc 56 is positioned an annulus 65 constituted by the edge of a dished member 58 fitted over the spindle 57 of said disc.

The upper surface of said annulus 65 carries a pointer 66 or reference mark, while the bottom of the dished member 58 is provided with seven openings 67a, 67b, . . . adapted to be engaged selectively by a stud 68 provided on the lower surface of the disc 56 (Figs. 5 and 6). This bottom of the dished member 58 is subjected to the action of a spring 70 which has a tendency to raise it and, thus, to make the stud 68 engage that one of said openings 67 registering with it whereby the disc 56 and the annulus 65 are constrained to rotate in unison. The spindle 57 carrying the disc 56 and the member 58 passes through a socket 69 carrying at one of its ends a sector-shaped arcuate plate 71 (Figs. 3 and 5) extending over the front surface of the case 50; said plate 71 is comparatively elastic and is provided under its lower surface with a boss 72 adapted to engage selectively (Fig. 5) either of two notches or recesses 73 provided in the front surface of the case 50. A small projection 74 rigid with said plate 71 allows shifting it so as to make it pass from one position to the other.

The other, inner end of the socket 69 carries an annular disc 75 provided with six openings 76a, 76b, . . . (Fig. 7) adapted to be engaged selectively by a boss 77 carried at one end of a spring blade 78 secured at 79 through its other end to the corresponding toothed above-mentioned sector-shaped member 58'. The boss 72 cooperating with notches 73 and the boss 77 cooperating with the openings 76a, 76b, . . . form thus two elastic connecting means for the socket 69 of which the former is comparatively powerful, while the second is comparatively light.

The plate 71 is subdivided into six small elements terminating each by a reference mark or pointer and carrying each two series of inscriptions, to wit: an indication of luminosity, when exposure is to be made in daylight and an indication of range for the case of exposure to the illumination by a flash-light bulb of a predetermined type. Thus, the six elements which are designated respectively by the letters A, B, C, D, E and F, may carry the following indications:

A: snow—sea—intense sunlight
 bulb: P F 1 at 1.50 meter
B: normal sunlight
 bulb: P F 1 at 2 meters
C: pale sunlight
 bulb: P F 1 at 3 meters
D: light shade
 bulb: P F 1 at 4 meters
E: dull weather
 bulb: P F 1 at 5 meters
F: dark weather
 bulb: P F 1 at 6 meters.

This arrangement allows using the apparatus in daylight or under flash-light conditions without requiring any calculation or adjustment of a tedious or difficult execution.

As a matter of fact, assuming, for instance, that the film contained in the camera has a sensitivity of 21/10 D.I.N., the reference mark 66 on the annulus 65 should be first brought into registry with the corresponding scale subdivision on the disc 56.

To this end, a pressure is exerted by two fingers of the operator's hand on the annulus 65, so as to release the dished member 58 rigid with the latter with reference to the stud 68 on the disc 56, this being provided against the pressure of the spring 70. It is then possible to turn the annulus 65 without driving the disc 56 until the reference mark 66 registers with the scale subdivision desired.

Upon releasing the annulus 65, the spring 70 urges the latter upwardly and the stud 68 reengages the desired opening facing it, to wit that 67e in the case illustrated.

The adjustment can then be proceeded with, which is performed by taking into account the luminosity in the case of daylight photographing or the range, when the photograph is taken under flash-light conditions.

In the first case and assuming, for instance, that the weather is dull, the operator causes the annulus 65 to rotate until its reference mark 66 registers with a mark on the element E of the plate 71. This rotation of the annulus 65 leads to a similar rotation of the disc 56 and, consequently, of the spindle 57 and of the sector-shaped member 58'. The latter produces through the pinion 62 an angular shifting of the diaphragm disc 63, so that the diaphragm opening 64a . . . 64f of the desired diameter is brought into registry with the axis of the objective system 51.

According to the subject or scene to be photographed, it is now necessary to define whether the exposure is to be made at a shutter speed of $\frac{1}{50}$ or $\frac{1}{200}$ of a second. In the first case, the plate 71 occupies the position illustrated in Fig. 1 corresponding to the engagement with one recess 73; in other words, the indication $\frac{1}{50}$ is uncovered by said plate. The camera is, thus, ready for an exposure at a shutter speed of $\frac{1}{50}$ under dull weather conditions.

Figure 2:
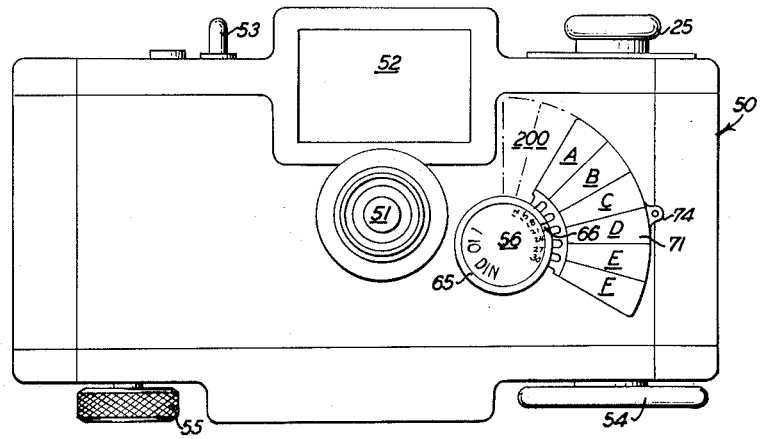
Fig. 2 is a similar view corresponding to daylight exposure at a view-taking speed of 1/200 for a different luminosity.

If, on the contrary, the luminosity is good and, for instance, there is a pale sunshine and if the photograph is to be taken at a shutter speed of $\frac{1}{200}$, the annulus 65 and the disc 56 are angularly shifted bodily, so that the reference mark 66 may be brought into registry with the mark on the element D of the plate 71 and said plate is shifted manually until its boss 72 engages the other recess 73. Thus, as illustrated in Fig. 2, the indication $\frac{1}{50}$ disappears and that $\frac{1}{200}$ appears in its stead in the upper part of the case wall.

It should be remarked that, when the operator rotates the annulus 65 and the disc 56 with a view to adjusting the diaphragm, the plate 71 carrying the elements A, B, C, . . . remains stationary since the boss 77 carried by the sector 58' snaps elastically out of one opening 76 into another in the disc 75 rigid with the plate 71. On the contrary, when the plate 71 is shifted manually from one view-taking speed to another, the sector 58' is rotated bodily with the spindle 57, the disc 56 and the annulus 65, so that the diaphragm opening is modified.

In the case where the view-taking is performed under flash-light conditions, with a PF 1 bulb, the operator has only to take account of the view-taking range. To this end, and through a rotation of the annulus 65 and of the disc 56, he brings the reference mark 66 into registry with the element carrying the indication corresponding to the desired range. Thus, in the case illustrated in Fig. 3, the reference mark 66 has been brought into registry with the sector A, since the subject or the scene to be photographed is at a distance of 1.50 meter from the apparatus.

As concerns its inner arrangement, the camera is provided on one side thereof with a usual spindle (not shown) adapted to carry a loading magazine carrying the film, while, to the other side of the camera, see Fig. 11, there is provided a cylinder 14 freely revolvable around a cylindrical cage 15 rigid with the case and opening into the upper surface of the latter. The cylinder 14 forms the body of the take-up spool although its diameter is much larger than the conventional diameter of such spools.

The empty space inside the cylindrical cage 15 forms the housing for the larger components of the flash-light system, to wit: a removable bulb 16 and its reflector 17.

The flash-light bulb 16 and the reflector 17 are fitted on a support 22 slidingly fitted inside the cylinder formed by the cage 15. Said support 22 includes a socket 23 removably carrying the bulb 16, while an arm 24 rigid with said socket has its upper end shaped as a cap 25 adapted to form a fluidtight closing of the opening provided in the upper wall of the case coaxially with the cylindrical cage 15.

Said cap-carrying arm 24 is provided in its central section with a stud 26 to which are pivotally secured one or more reflector elements 17 in the shape of spherical caps. These elements are adapted to form together the complete reflector. A spring washer which is not illustrated in the drawings is fitted between the head of the screw forming the reflector-carrying pivot and said elements 17, so as to allow the latter to be held fast either in folded superposed relationship or in their open operative position illustrated in Figs. 3, 10 and 11.

Figure 3:
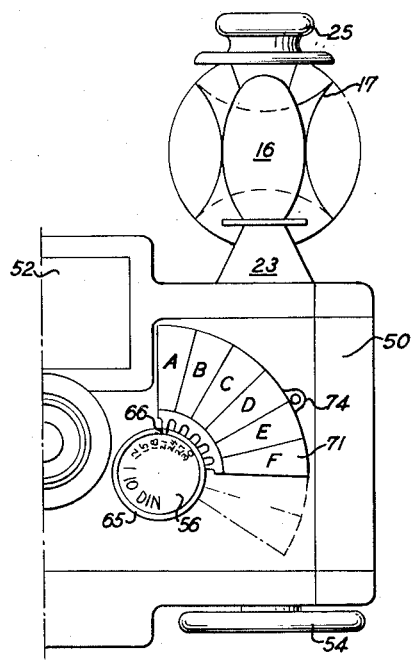
Fig. 3 is a partial front elevational view, the camera being set for flash-light conditions.

In proximity with its upper end, the cylindrical cage 15 carries two contact-pieces 28 electrically connected with the flash-light circuit and adapted to cooperate with two terminals 29 rigid with the socket 23, so as to provide means for connecting the bulb 16 with the electric circuit of the flash-light. Said arrangement allows the obtaining of a closed electric circuit only if the support 22 for the bulb 16 and the reflector 17 has been drawn out as illustrated in Figs. 3, 10 and 11. The flash-light is illuminated of course only at the moment of the release of the shutter as provided by the closing of switches which are not illustrated.

It is thus apparent that if the operator wishes to take a photograph under flash-light conditions, it is sufficient for him to draw out the arm 24 through action on the cap 25, to set the reflector in its operative position through an angular opening of its elements round the stud 26, after which he releases the shutter after a preliminary adjustment of the diaphragm opening, as explained hereinabove.

Figure 1:
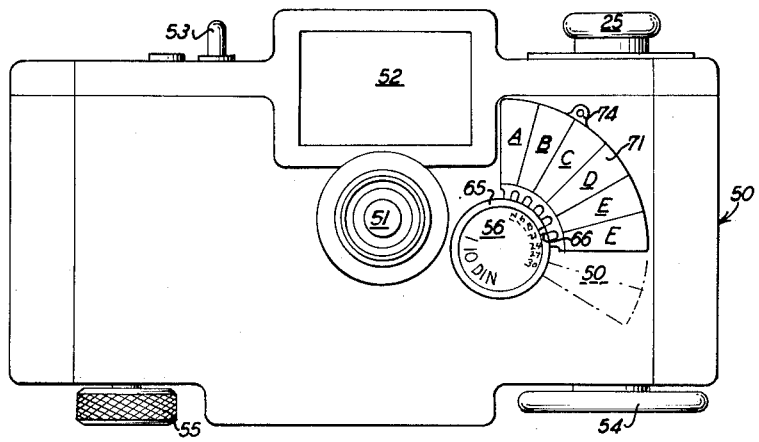
Fig. 1 is a front elevational view of the camera when used for taking a view under daylight conditions at a speed of 1/50 of a second.

If, in contradistinction, the photograph is to be taken without the flash-light system, the arrangement including the arm 24, the cap 25, the bulb 16 and the reflector 17 is left in its collapsed position inside the case 50, as illustrated in Figs. 1 and 2. The contact pieces 28 being then spaced with reference to the terminals 29, the release of the shutter does not produce operation of the flash system, even if the bulb 16 is positioned inside the socket 23.

Obviously, means should be provided so that the reflector 17 may always be set in a suitable direction. To this end, the arm 24 is provided with lateral ribs 30 sliding inside the cooperating guiding grooves in the cylindrical cage 15.

Taking into account the fact that it is impossible with such a camera using a magnesium or the like flash-light bulb to take a photograph at a shutter speed of $\frac{1}{200}$ of a second, there is provided an arrangement preventing the operator from using said speed under such conditions and automatically bringing the camera into a condition for which the shutter speed is $\frac{1}{50}$ whenever the support for the flash-light bulb is drawn out of the case of the camera into its operative position.

To this end, the annular disc 75 rigid with the socket 69 and consequently with the plate 71 carrying the elements A, B, C, . . . is provided with a lateral projection 81 to which is secured a spring 82 which controls the speed of operation of the shutter which is not illustrated. In the plane of movement of said projection 81 is arranged a lever-arm 83 lying between the case 50 of the camera and the inner cage 15 rigid therewith (Fig. 11) and which serves as a housing for the bulb support. Said lever-arm 83 is keyed to a short spindle 84 passing through the wall of said cage and carrying inside the latter a further lever-arm 85. Through its own weight, the lever 83—85 occupies the freely dropping position illustrated in dotted lines in Figs. 8 and 9 when the camera is in its operative position.

Assuming that the camera is adjusted, for instance for a shutter speed of $\frac{1}{50}$ of a second, the projection 81 rigid with the annular disc 75 occupies the position illustrated in dotted lines in Fig. 8. It is apparent that the raising of the bulb support outside the case with a view to bringing the flash-light system into its operative position produces a mere oscillation of the lever 83—85, as illustrated in interrupted lines in Fig. 8.

If, on the contrary, the camera is in its position corresponding to a shutter speed of $\frac{1}{200}$ of a second, the projection 81 occupies the position illustrated in Fig. 9. The raising of the bulb support produces then through a rocking of the lever 83—85 a shifting of the projection 81 (and consequently of the disc 75) into the position illustrated in dot and dash lines in Fig. 8. The projection 81, the disc 75, the socket 69 and the plate 71 are thus returned into their view-taking position corresponding to a speed of $\frac{1}{50}$, the diaphragm opening being modified by way of a consequence.

The film 36 unwinds out of a magazine and rewinds on take-up spool 14 through rotation imparted positively to said spool. In the case illustrated, the passage of one picture area to the next requires a rotation of said spool 14 by one third of a revolution.

To this end, the cylinder forming the spool 14 includes not only two small flanges 35 which allow guiding the film during its winding, but also a lateral transverse wall 36 located between the bottom of the case 50 and the lower end of the cylindrical cage 15. Said wall 36 includes in a central section a projection 37 forming a pivot for the take-up spool and passing freely through the bottom of the case 50. Said pivot 37 carries underneath said case bottom a knob 54 which forms the member controlling the progression of the film.

The progression of the film is limited exactly to the distance separating the centers of two successive picture areas. When the whole film has been exposed, its rewinding into the magazine is obtained through a rotation of the knob 55.

My improved camera described hereinabove shows the following main advantages: its method of operation is very simple inasmuch as the operator has no calculation to make before focusing, even if the view is taken under flash-light conditions.

Its handling is very convenient, since it incorporates the flash-light system which may be used when required, the bulk of the camera not being substantially larger than that of a conventional camera producing small size pictures.

Although the flash-light system is incorporated with the camera, it may be removed entirely, so that it is possible for the user to buy the camera alone and to buy only subsequently all or part of the flash-light system. It should furthermore be remarked that when the camera is bought alone, the system including the support 22 with the socket 23, the arm 24 and the cap 25 is replaced by an ordinary plug closing the upper end of the cylindrical cage 15.

What I claim is:

1. In a photographic camera including a case, the combination of a hollow film take-up spool, a cylindrical cage rigid with the camera case and over which said hollow spool is revolvably fitted, a support slidingly carried inside the cage and adapted to be shifted between an inner inoperative and an outer operative position, a flash-light bulb and a reflector therefor carried by said support and projecting outside the camera case when the support is in its outer operative position and collapsing with the latter inside the camera case for the inner inoperative position of said support.

2. In a photographic camera including a case, the combination of a hollow film take-up spool, a cylindrical cage rigid with the camera case and over which said hollow spool is revolvably fitted, a support slidingly carried inside the cage and adapted to be shifted between an inner inoperative and an outer operative position, a flash-light bulb and a reflector therefor carried by said support and projecting outside the camera case when the support is in its outer operative position and collapsing with the latter inside the camera case for the inner inoperative position of said support, a circuit for igniting the flash-light bulb including two switches, means controlled by the position of the support and closing one of said switches when in its operative position, and hand-operable means on the outside of the case for closing the other of said switches.

3. In a photographic camera including a case including speed-adjusting means, the combination of a hollow film take-up spool, a cylindrical cage rigid with the camera case and over which said hollow spool is revolvably fitted, a support slidingly carried inside the cage and adapted to be shifted between an inner inoperative and an outer operative position, a flash-light bulb and a reflector therefor carried by said support and projecting outside the camera case when the support is in its outer operative position and collapsing with the latter inside the camera case for the inner inoperative position of said support, a lever pivotally secured to said cage and including a first arm extending inside the latter and a second arm adapted to rock between the cage and the inner wall of the case, a member pivotally carried by the case, controlling the speed-adjusting means and including a projection extending into the path of said second lever arm for the position corresponding to the higher speed condition, and means whereby the outward shifting of the bulb-carrying support acts through said lever on the projection to urge said member into its position corresponding to the lower speed condition.

4. In a photographic camera including a case, the combination of a hollow film take-up spool, a cylindrical cage rigid with the camera case and over which said hollow spool is revolvably fitted, a support slidingly carried inside the cage and adapted to be shifted between an inner inoperative and an outer operative position, a flash-light bulb and a reflector therefor made of a plurality of linked elements carried by said support and projecting outside the camera case when the support is in its outer operative position and collapsing with the latter inside the camera case for the inner inoperative position of said support.

5. In a photographic camera including a case, the combination of a hollow film take-up spool, a cylindrical cage rigid with the camera case and over which said hollow spool is revolvably fitted, a support slidingly carried inside the cage and adapted to be shifted between an inner inoperative and an outer operative position, a flash-light bulb and a reflector therefor carried by said support and projecting outside the camera case when the support is in its outer operative position and collapsing with the latter inside the camera case for the inner inoperative position of said support, a sector operatively connected with the diaphragm and shiftable into different angular positions defining the speed of operation of the camera, and means whereby the bulb support, when in its outer position, prevents the sector from entering at least one of said angular positions.

References Cited in the file of this patent

UNITED STATES PATENTS

| | | |
|---|---|---|
| 883,607 | Andrews | Mar. 31, 1908 |
| 2,204,518 | Tait | June 11, 1940 |
| 2,213,749 | Strauss | Sept. 3, 1940 |
| 2,245,214 | Mihalyi | June 10, 1941 |
| 2,317,465 | Kende et al. | Apr. 27, 1943 |
| 2,388,995 | Pollock | Nov. 13, 1945 |
| 2,596,328 | Dorsey | May 13, 1952 |
| 2,783,696 | Sewig | Mar. 5, 1957 |